United States Patent
Davies et al.

(10) Patent No.: US 9,005,742 B2
(45) Date of Patent: Apr. 14, 2015

(54) LABEL FOR REMOVABLE ATTACHMENT TO AN ARTICLE

(71) Applicant: Spear Group Holdings Limited, Cwmbran (GB)

(72) Inventors: David John Davies, Usk (GB); Darren Hammonds, Leek (GB)

(73) Assignee: Spear Group Holdings Limited, Cwmbran (GB)

( * ) Notice: Subject to any disclaimer, the term of this patent is extended or adjusted under 35 U.S.C. 154(b) by 0 days.

(21) Appl. No.: 13/644,361

(22) Filed: Oct. 4, 2012

(65) Prior Publication Data

US 2013/0146230 A1    Jun. 13, 2013

Related U.S. Application Data

(63) Continuation of application No. 11/910,820, filed as application No. PCT/GB2006/001203 on Mar. 31, 2006, now Pat. No. 8,304,073.

(30) Foreign Application Priority Data

Apr. 6, 2005   (GB) .................................. 0507077.6

(51) Int. Cl.
   *B32B 7/02*    (2006.01)
   *B32B 27/08*   (2006.01)
   (Continued)

(52) U.S. Cl.
   CPC .............. *G09F 3/10* (2013.01); *B32B 2367/00* (2013.01); *B32B 2307/518* (2013.01); *B32B 2307/732* (2013.01); *B32B 2250/03* (2013.01); *B32B 2519/00* (2013.01); *B32B 2250/24* (2013.01); *B32B 2307/54* (2013.01); *B32B 2323/10* (2013.01); *B32B 2405/00* (2013.01); *B32B 2307/30* (2013.01); *C09J 7/0296* (2013.01); *G09F 3/02* (2013.01); *B32B 1/02* (2013.01); *B32B 27/08* (2013.01); *B32B 27/32* (2013.01); *B32B 27/36* (2013.01); *B32B 43/006* (2013.01)

(58) Field of Classification Search
   CPC ........................... B32B 2323/10; C09J 7/0275
   See application file for complete search history.

(56) References Cited

U.S. PATENT DOCUMENTS 4,246,709 A    1/1981   Selleslags et al.
4,405,775 A    9/1983   Hashimoto (Continued)

FOREIGN PATENT DOCUMENTS

EP    312037 A2    4/1989
EP    0335425 A2   10/1989

(Continued)

OTHER PUBLICATIONS

Coefficients of Linear Thermal Expansion (no date).*
Brandt, O, Ermudungsverhalten Thermischer Spritzschichten, Abschlussbericht, EMPA Thun, 1998, Bericht Nr. 162/161, 16 pages.
Brockhaus Enzyklopadie, 19, Auflage Verlag F. A. Brockhaus, Mannheim, 3. Band 1987, Seite 326, 3 pages.

(Continued)

*Primary Examiner* — Jeff Vonch
(74) *Attorney, Agent, or Firm* — Goodwin Procter LLP

(57) ABSTRACT

A label for removable application to an article such as a beverage bottle includes a backing layer (2) comprising a laminate of a bi-axially oriented polyester such as PET (12) and a bi-axially oriented polypropylene (14). The polyester film (12) has a lower coefficient of thermal expansion than the polypropylene film (14). Consequently, when the label is heated, it will tend to curl and this effect can be used to assist in the removal of the label from the article in a hot washing bath during recycling of the article.

14 Claims, 2 Drawing Sheets

(51) Int. Cl.

| | |
|---|---|
| *B32B 27/32* | (2006.01) |
| *B32B 27/36* | (2006.01) |
| *G09F 3/10* | (2006.01) |
| *B65D 23/00* | (2006.01) |
| *B65D 23/08* | (2006.01) |
| *C09J 7/02* | (2006.01) |
| *G09F 3/02* | (2006.01) |
| *B32B 1/02* | (2006.01) |
| *B32B 43/00* | (2006.01) |

(56) References Cited

U.S. PATENT DOCUMENTS

| | | | |
|---|---|---|---|
| 4,939,009 | A | 7/1990 | Beavers et al. |
| 5,190,609 | A | 3/1993 | Lin et al. |
| 5,591,290 | A | 1/1997 | Walter et al. |
| 5,637,366 | A | 6/1997 | Davis et al. |
| 5,709,937 | A | 1/1998 | Adams et al. |
| 5,712,031 | A * | 1/1998 | Kelch et al. ............ 428/355 BL |
| 6,503,619 | B1 | 1/2003 | Neal et al. |
| 6,680,097 | B1 * | 1/2004 | Amberger et al. ........... 428/40.1 |
| 6,733,855 | B1 | 5/2004 | Scott |
| 2003/0047277 | A1 | 3/2003 | Bell et al. |
| 2003/0072901 | A1 | 4/2003 | Dronzek |
| 2004/0028866 | A1 | 2/2004 | Sellars |
| 2004/0038026 | A1 | 2/2004 | Li et al. |
| 2004/0219321 | A1 | 11/2004 | Squier et al. |
| 2005/0202239 | A1 | 9/2005 | Chu et al. |
| 2006/0251891 | A1 | 11/2006 | Aarnio |
| 2009/0233067 | A1 * | 9/2009 | Doornheim et al. ......... 428/203 |

FOREIGN PATENT DOCUMENTS

| | | |
|---|---|---|
| EP | 0951004 A2 | 10/1999 |
| EP | 1033393 A2 | 9/2000 |
| JP | 4350892 | 4/1992 |
| JP | 6259017 A | 9/1994 |
| JP | 09114382 | 5/1997 |
| JP | 9265258 | 7/1997 |
| JP | 10105064 | 4/1998 |
| JP | 11057558 | 2/1999 |
| JP | 2004018076 A | 1/2004 |
| WO | WO-02/29768 A2 | 4/2002 |
| WO | WO-2005085381 A1 | 9/2005 |
| WO | WO-2006076327 A1 | 7/2006 |
| WO | WO-2006106309 A1 | 10/2006 |

OTHER PUBLICATIONS

Callister, William D., "Materials Science and Engineering an Introduction," New York: John Wiley & Sons, Inc., 2007, Ed. 7, 6 pages.
Coefficient of Linear Themal Expansion, no date.
English Abstract for EP 312037 A2, Apr. 1989.
English Abstract of JP 09-114382 A.
English language translation of Opposition letter dated Feb. 18, 2011 from Weickmann & Weickmann to the European Patent Office for European Patent No. 1 866 895, 13 pages.
ExxonMobil Chemical: Label-Lyte LL 536 Product Sheet Oct. 2004, 1 page.
Hull, Derek, "An Introduction to Composite Materials," UK: Cambridge University Press, 1991, ISBN 052128392, 4 pages.
International Search Report for PCT/GB2006/001203, Jul. 14, 2006, 2 pages.
Joachim Nentwig, "Kunststoff-Folien: Herstellung, Eigenschaften, Anwendung," pp. 38-41 (Carl Hanser Verlag Munchen Wien, Germany, 1994) filed with English translation, 19 pages total.
Machine Translation of JP 10-105064 A, Apr. 1998.
Machine Translation of JP 2004018076 A, Jan. 2004.
Oberbach et al., Saechtling, "Kunststoff-Taschenbach," 29. Ausgabe 2004, Carl Hanser Verlag Munchen, Wien, S. 125-128, 422-435, 491-505, 512-514, 551-559, 659, 674, 675, 700, 701, 787-790, 34 pages.
Opposition Grounds filed in European Patent No. 1 866 895, dated Feb. 21, 2011, 32 pages.
Opposition Response filed in European Patent No. 1 866 895, dated Oct. 7, 2011, 10 pages.
Opposition Statement filed in European Patent No. 1 866 895, dated Feb. 18, 2011, 29 pages.
Produkdatenblatt zu dem Kunststoff Polypropylen (PP), vgl. www. ansler-frey.ch, 1 page.
Produktdatenblatt ExxonMobil Chemical: Label-Lyte LL536 aus Oct. 2004, 1 page.
Produktdatenblatt zu einem Polyester-Material PET, vgl. www. amsler-frey.ch, 1 page.
Rasche, Manfred, 1991, Vorschlag Fur ein Dimensionierungsverfahren elastischer Klebverbindungen, In: Rudolf Hinterwaldner (Hg.), 17 pages.
U.K. Patent Office Search Report for GB0507077.6, Apr. 27, 2007, 5 pages.
Wiley-Interscience Publishers, Encyclopedia of Polymer Science and Engineering, vol. 13, 1988. USA: John Wiley & Sons, Inc., ISBN: 04-471-80945-4, 27 pages.

* cited by examiner

23°C
FLAT

60°C
180°

80°C
360°

LABEL FOR REMOVABLE ATTACHMENT TO AN ARTICLE

This invention relates to labels which are removably attached to articles. More particularly, although not exclusively, the invention relates to labels for attachment to articles in the form of containers, such as glass bottles.

Traditionally, labels for beverage bottles have been made of paper, and affixed to the bottles using a wet-glue process. In this process, the labels are supplied free of adhesive; the adhesive is applied to the label shortly before the label is applied to the bottle. The labelling operation usually occurs in the bottling line, after the bottle has been filled and closed.

More recently, labels made from thermoplastic film have become popular. These labels are usually supplied with a pressure-sensitive adhesive already on one face of the base material, the adhesive layer being covered by a release layer to prevent premature bonding. Labels made from thermoplastic film enable a greater range of decorative effects to be achieved. Since the thermoplastic films may be transparent, the backing material of the label may be almost invisible so that the printed material on the label appears to be printed directly onto the bottle. Furthermore, the use of a pressure sensitive adhesive avoids problems which can arise when handling liquid adhesive near the bottling line.

It is common for bottles to be returnable for reuse. When bottles are reused, they may be filled with a different beverage from that which they held previously, and consequently it is necessary to remove all labels from returned bottles. Label removal systems were developed for use with paper/wet-glue labels. In general, such systems involve the washing of the bottles in a hot solution of caustic soda. The caustic solution penetrates the paper material of the label and interacts with the adhesive, for example by dissolving it, so that the label is separated from the bottle. Mechanical means, such as brushes or sprays may be used to assist label removal, or the bottles may simply be agitated in the caustic solution.

There is resistance, on economic grounds, to major alterations in bottling lines. Consequently, bottlers are reluctant to invest in entirely new bottle washing equipment to cope with different label types. This results in pressure on label suppliers to develop labels using thermoplastic films which can be removed adequately by conventional hot caustic washing systems. A problem that arises is that thermoplastic films are not significantly penetrated by the hot caustic solution, which means that the solution can initially contact the adhesive only at the edges of the label. As a result, label removal can be unacceptably slow.

Various measures have been proposed to speed up the removal of labels based on thermoplastic film materials. For example our British Patent Application No 0419398.3 discloses the use of a heat-sensitive pressure-sensitive adhesive which loses peel strength when heated to the temperatures encountered in hot caustic washing systems. The same document also discloses the provision of micro-channels at the interface between the adhesive and the bottle in order to assist the penetration of the washing liquid in to the adhesive. The micro-channels may be produced either by embossing the label or by applying an adhesive deadening material over parts of the adhesive surface.

U.S. Pat. No. 6,680,097 discloses a label made from stretched film which shrinks when heated. The intention is that the shrinking effect causes the label to pull back along the bottle so degrading the adhesion between the label and the bottle.

A problem with shrinkage-based systems such as disclosed in U.S. Pat. No. 6,680,097 is that stretched thermoplastic films shrink to a rigid "stick-like" structure which can be difficult to extricate from the washing machine and subsequently may get trapped in the workings of the washing equipment. Furthermore, film materials which demonstrate adequate shrinking properties at the temperatures encountered in commercial washers tend to be either expensive or environmentally undesirable.

According to the present invention, there is provided a label which is removable from an article when heated, the label comprising a backing layer which is a polymeric film and an adhesive layer for bonding the label to the article, the material of the backing layer being such that the backing layer expands when subjected to heat, there being differential expansion between the opposite faces of the backing layer so that the label tends to curl into a curved configuration with the adhesive layer on the outside of the curve.

Such a label, when affixed to an article such as a beverage bottle and placed in a hot caustic bath, will generate forces, in the manner of a spring, tending to lift regions of the label away from the bottle. This, in turn, allows the washing liquid to penetrate beneath the lifted regions of the label, so accelerating the removal process.

The backing layer may comprise a laminate of two different materials having different coefficients of thermal expansion. Thus, the material adjacent the adhesive layer will have a greater coefficient of thermal expansion than the other material of the backing layer so that the label, when heated, will tend to curl away from the article to which it is affixed.

In a preferred embodiment, the two materials of the laminate forming the backing layer may be a polypropylene film and a polyester film. One or both of the films may be oriented, and preferably bi-axially oriented, by stretching. In a preferred embodiment of a label of which the backing layer comprises a polypropylene/polyester laminate, the polypropylene film is situated adjacent the adhesive layer.

The films of the laminate may be of a different thickness from each other. For example, one layer may have a thickness which is 20% to 75% of the thickness of the other layer. The thicker layer may have a thickness in the range 15 to 60 μm.

Where the backing layer comprises a laminate of polypropylene and polyester films, the polypropylene film may have a thickness in the range 15 to 60 μm, more preferably 50 μm and the polyester film may have a thickness in the range 12 to 30 μm preferably 19 or 23 μm.

Bi-axially oriented films have a "machine direction", which is the direction in which the film travels during the manufacturing process and a "transverse direction" which is the direction in the plane of the film extending perpendicular to the machine direction. The properties of the film are not usually the same in both of these directions. In order to obtain good results (ie optimum curl) in a label in accordance with the present invention having a backing layer comprising a polypropylene/polyester laminate, it is believed that the modulus of elasticity of the polypropylene film is important. It is currently believed that the modulus of elasticity of the polypropylene film in the machine direction is preferably 2000 to 2500 N/mm$^2$, more preferably 2100 to 2300 N/mm$^2$, and in the transverse direction is preferably 3000 to 4000 N/mm$^2$ more preferably 3250 to 3750 N/mm$^2$. It is presently believed that a polyester film having a modulus of elasticity of 4000 to 5000 N/mm$^2$, preferably 4500 N/mm$^2$, in the machine direction and 4500 to 5500 N/mm$^2$, preferably 5000 N/mm$^2$, in the transverse direction provides good results.

As an alternative to using a backing layer comprising laminated films, the backing layer may comprise a base layer for example of bi-axially oriented polypropylene, provided with a coating of a high tensile, low elongation material, for example a polymeric (for example polyester) solution. Suitable coating materials are amorphous saturated co polyester resins such as that available under the designation VITEL 2200B from Bostik Findley Limited. The coating acts to restrain expansion of the base layer, and so is provided on the surface of the layer away from the adhesive layer, causing the base layer to curl away from the article to which the label is affixed when subjected to heat.

For a better understanding of the present invention, and to show more clearly how it may be carried into effect, reference will now be made, by way of example, to the accompanying drawings, in which:—

Figure 1:
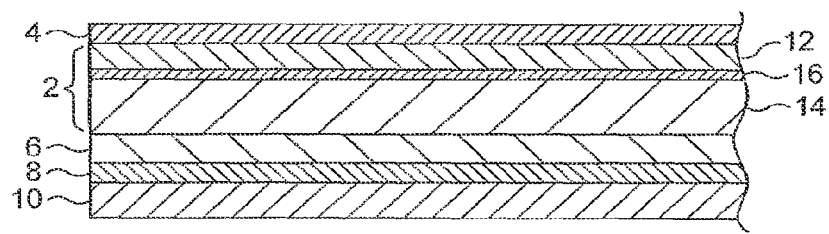
FIG. 1 shows, in diagrammatic form, the construction of a label for a bottle.

Referring to FIG. 1, the label is shown diagrammatically on an enlarged scale for the sake of clarity. Generally speaking, the label comprises a backing layer 2, provided with a print layer 4 on one face and an adhesive layer 6 on the opposite face. The adhesive layer 6 is provided with a release layer 10. Optionally, an adhesive deadening layer 8 is applied to the adhesive layer 6.

The print 4 is shown as a consistent layer although, in practice, only parts of the layer may be printed. Similarly, the adhesive deadening layer 8 is applied over only some of the adhesive layer 6, for example as a pattern of dots as described in more detail in our Patent Application 0419398.3, which is incorporated herein by reference.

The backing layer 2 has a laminated structure and comprises an outer film layer 12 and an inner film layer 14, laminated together by means of a laminating adhesive 16. The films 12 and 14 may be of any two materials having different coefficients of thermal expansion. Preferably, the outer film 12 has a lower coefficient of thermal expansion than the inner layer 14 so that, when heated, the label will curl in the direction away from the adhesive layer 6. In other words, the label will curl about an axis situated above FIG. 1.

In a specific embodiment of a label as shown in FIG. 1, the outer layer 12 of the laminate 2 is a biaxially oriented polyester, and is preferably a polyethyleneterephthalate (PET) film. A suitable film is available under the designation Melinex® 313. PET has a linear coefficient of thermal expansion in the range 20 to $80 \times 10^{-6}$ K$^{-1}$.

The lower film 14 of the laminate 2 is preferably a polypropylene film and may be the film available from ExxonMobil under the designation Label-Lyte 50LL536. Polypropylene has a linear coefficient of thermal expansion in the range 100 to $180 \times 10^{-6}$ K$^{-1}$. It will thus be appreciated that the coefficient of thermal expansion of polypropylene is approximately at least double that of PET, and may be five or more times greater.

The adhesive layer 6 preferably comprises a heat sensitive pressure sensitive adhesive. In the context of the present invention, "heat-sensitive" means that the adhesive properties of the adhesive layer degrade or diminish on heating to a temperature in the range 40° C. to 120° C., whether or not in the presence of a washing fluid. Preferably, the diminution of adhesive properties occurs at temperatures in the range 40° C. to 90° C., and more preferably temperatures in the range 50° C. to 85° C. In preferred embodiments, the adhesive properties of the adhesive layer diminish at a temperature in the range 60° C. to 80° C. and more preferably 65° C. to 75° C.

The expression "heat sensitive" is not to be taken as indicating that the adhesive properties of the adhesive layer diminish instantaneously when subjected to a sufficiently high temperature, but within a time consistent with the requirements of a washing process. Thus, the diminution of adhesive properties preferably occurs not more than 3 minutes after the article carrying the label is subjected to the appropriate temperature. However, it is to be appreciated that longer periods, for example of not more than 10, 8 or 5 minutes after the article is subjected to the elevated temperature would still be regarded as falling within the broad scope of the present invention.

The adhesive property which diminishes when the article is subjected to the elevated temperature is the adhesion, or peel strength, of the adhesive layer. Preferably, the peel strength decreases by at least 30%, and in some cases by at least 40% or even 50%, when the article is subjected to the elevated temperature. In especially preferred embodiments, the peel strength reduces to approximately 20% of the peel strength at ambient conditions, i.e. a reduction of 80%. In general, a reduction in peel strength will be sufficient for the purposes of the present invention if the remaining peel strength of the adhesive layer is inadequate to retain the label on the article when the article is subjected to the mechanical action of a high temperature washing liquid in a normal commercial washing process. An industry recognized test for peel adhesion is described in the FINAT Technical Handbook 6$^{th}$ Edition and is FTM1, Peel Adhesion (180°) at 300 mm per minute. The peel test describes the permanence of adhesion or peelability of pressure sensitive adhesives. Test strips of 25 mm wide are prepared, adhered to the test plate (glass or metal) and then checked after a specific period (usually 20 minutes and 24 hours). The force required to peel the label material from the test plate is recorded in Newtons and observations on adhesive transfer are noted. For the purposes of the present invention, what is most important is that the peel adhesion to the article under the washing conditions is low, for example no more than 5N/25 mm. The peel adhesion at ambient conditions depends on how heat sensitive the adhesive is and also on coat weight, but could be as high as 25N/25 mm.

The peel strength to be considered in the context of the present invention is the peel strength of the adhesive layer when the label is applied to the intended article, which may be made from glass, plastics, metal or ceramics, for example.

The pressure sensitive adhesive may be a solvent-borne, water-borne or hot-melt, permanent, pressure sensitive adhesive having a combination of polymer component and surfactant component, which permit the label to be removed from an article to which the label has been attached, preferably within a period of 10 minutes using an aqueous wash at between 60° C. and 90° C. The adhesive material may be rubber-based, acrylic-based, or modified acrylic-based. In a preferred embodiment, acrylic-based adhesives are used, modified in order to enhance their heat-sensitive properties to comply with the requirements mentioned above. Modification of the base adhesive material may comprise the addition of a surfactant, which may be an anionic, amphoteric, cationic, non-ionic or polymeric surfactant. If an anionic surfactant is used, it may comprise any one of various organic sulphates, sulphonates, sulphonic acids, salts and blends thereof, or sulphosuccinates. If a non-ionic surfactant is used, it may comprise an ethoxylate, an alcohol ethoxylate or an alkoxylate. The surfactant is preferably present in the adhesive material in an amount not more than 5%, preferably not more than 3%, and more preferably not more than 2%. The surfactant is preferably reactive so that it attaches to functional groups in the polymer of the adhesive. This avoids the possibility that the surfactant can wash out of the adhesive layer, for example if the article carrying the label is immersed in water below the temperature at which the adhesive layer loses its adhesion. For example, if the article is a beer or wine bottle, it may be immersed in iced water to cool its contents before consumption.

The adhesive material is preferably non-resinated, that is to say it lacks any additional tackifier or other added resin.

In achieving the functionality of the label as described herein it is preferable that the pressure sensitive adhesive is coated onto the filmic label facestock at a coat weight of between 10 gsm and 20 gsm. In a preferred embodiment the thickness of the adhesive layer may be lower than is conventionally used for pressure sensitive adhesive layers on labels. Preferably, the thickness of the adhesive layer is not more than 15 $g/m^2$, and may be not more than 14 $g/m^2$, although it is envisaged that in most applications, the adhesive layer will have a thickness not less than 10 $g/m^2$.

Optionally, and as shown in FIG. 1, the outer surface of the adhesive layer, prior to its application to an article, is provided with a coating of an adhesive modifying agent to provide the adhesive deadening layer 8. One example of an adhesive modifying agent is a UV-cured adhesive deadening varnish.

In preferred embodiments incorporating an adhesive modifying agent, the adhesive modifying agent serves to reduce the adhesive strength of the adhesive layer in the region or regions at which the adhesive modifying agent is applied. However, the expression "adhesive modifying agent" is used in a broad sense to mean any agent which has an effect on the chemical, physical or mechanical properties of the adhesive layer.

The adhesive modifying agent may be applied to the adhesive surface through direct printing by a conventional print process i.e. screen, flexographic, letterpress or gravure. To effect this, the face material and adhesive part of the construction is first de-laminated from the release liner to allow the printing of the adhesive modifying agent onto the now exposed adhesive face and then re-laminated after printing through a nip roller structure. Such release liners are invariable provided on labels with pressure-sensitive adhesive, to cover the adhesive during transport and handling so as to prevent the adhesive sticking unintentionally to itself or to other articles. The release layer is removed just before the label is affixed to the intended article.

The adhesive modifying agent may be applied to the full surface of the label or in patterns appropriate to the label profile.

The adhesive modifying agent may be applied as a series of round dots with the percentage coverage appropriate to the functional requirements of the individual label. Percentages in the range of 3% to 10% have been found preferable, these percentages being based on the artwork from which the printing rollers are produced. The printing structure may also take the form of square dots, parallel or intersecting lines and other structures known to those skilled in the art.

The mechanisms by which wash-off is facilitated by the preferred adhesive is that when the label is heated above 50° C., more preferably above 70° C., as would be typically encountered by the labeled container within a washing environment, it loses adhesion (i.e. peel strength) to the container by as much as 50% i.e. it can be peeled off the article more readily, although the adhesive does however retain some tack. The adhesion loss occurs fairly rapidly, preferably within 1 minute of immersion at the elevated temperature. This loss in adhesion facilitates the edges of the label lifting from the container through the curling action of the label, with the upwards curl force of the label being greater than the adhesion, allowing wash-off to be effected without any mechanical means other than the turbulence created by the water streams into which the edges of the label enter as they move away from the surface of the article. In addition, as the edges of the label lift from the container, through the curling action of the label, the washing solution is then able to ingress behind the label, between the adhesive layer and the article and complete the full removal of the label through a combination of physical and chemical means.

The physical removal of the label is effected by the turbulence created within the washer by its motion and more specifically the high liquid flow which is generated by the pumps at the label removal points of the machine. The force of the water movement being greater than that of the adhesion to the container, shears the label from the container.

The chemical removal of the label is effected by the adhesive coming into contact with the hot washing fluid, allowing chemical interactions to take place between the washing solution and additives in the adhesive, such as surfactants, that have the effect of eliminating the tack and therefore preventing the label from re-adhering to the container surface or to any other parts within the machine system.

It will thus be appreciated that a fundamental property of the adhesive material is its sensitivity to heat. This is in marked contrast to known pressure sensitive adhesives used for labels on articles such as bottles which are to be removed in a washing process. Known adhesives have been developed on the basis that conventional washing processes utilize an alkaline washing fluid such as an aqueous solution of NaOH, and have therefore been developed so as to be dissolved or otherwise made ineffective in the presence of such an alkaline fluid. Known adhesives are not heat sensitive, and consequently their properties are not affected, or are affected only insignificantly, by the application of heat alone (for example by immersion in hot water).

To affix the label shown in FIG. 1 to a bottle, the release layer 10 is removed exposing the adhesive 6 with its adhesive deadening layer 8, which is then applied to the bottle under pressure from, for example, a roller.

In its unstressed state at normal ambient temperatures, the label shown in FIG. 1 is generally flat. Thus, when applied to a bottle having a cylindrical shape, the label is curved around the bottle and acts as a stressed spring, attempting to regain its flat configuration and so attempting to overcome the adhesive and regain its flat configuration. Under normal use conditions of the bottle, the adhesive strength of the adhesive 6 is sufficient to retain the label in full face-to-face contact with the bottle.

Figure 2:
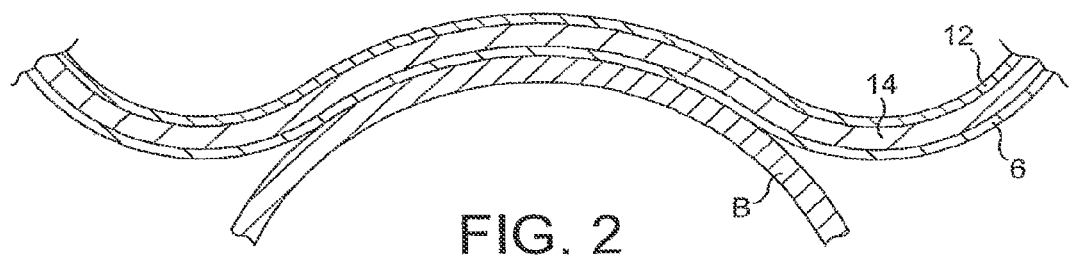
FIG. 2 shows a bottle provided with the label of FIG. 1 during a label removal process.

However, when immersed in hot washing liquid such as dilute caustic soda, heated to between 60° C. and 90° C., for example 60° C., the heat sensitive adhesive 6 suffers a reduction in a peel strength as described above Furthermore, not only is the stressed label biased towards its flat configuration, but, under the heat of the washing solution, the different expansion rates of the PET and polypropylene films 12 and 14 cause the label to curl away from the bottle as shown in FIG. 2. Initially, while the label is in substantially total face-to-face contact with the bottle, the curling effect is suppressed by the adhesive 6, but nevertheless the force tending to lift the edges away from the bottle increases substantially so accelerating the penetration of washing solution between the label and the bottle. Eventually, the label lifts substantially completely from the bottle and either releases under its own accord or under the action of mechanical brushes, sprays or agitation in the washing solution.

Figure 3A:
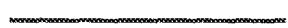
FIGS. 3a, 3b and 3c show different degrees of curl of a label.
Figure 3B:
Figure 3C:
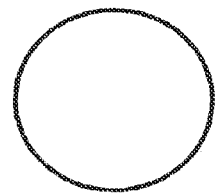

In order to assess the effectiveness of a label in accordance with the present invention, it is possible to measure the extent of curling of a label of specific dimensions (50 mm×70 mm) when subjected to heat, while not attached to an article. Labels were therefore tested by immersion in a 1 liter beaker of washing solution at various temperatures. Preferred labels in accordance with the present invention show a curl in excess of 180° C. at a temperature below 60° C. An example is shown in FIGS. 3a, 3b and 3c, showing the curvature of a label at the different temperatures indicated. Specific examples of label materials in accordance with the present invention but comprising laminates of biaxially oriented polypropylene and PET films of different thicknesses were tested in accordance with the above procedure at 80° C. and the resulting extent of curling was

TABLE

| Thickness of polypropylene film μm (A) | Thickness of PET film μm (B) | Angle of curl | B/A % |
|---|---|---|---|
| 50 | 23 | 360° | 0.46% |
| 35 | 23 | 360° | 0.66% |
| 50 | 19 | 405° | 0.38% |
| 35 | 19 | 420° | 0.54% |
| 50 | 15 | 405° | 0.30% |
| 35 | 15 | 420° | 0.43% |
| 50 | 12 | 360° | 0.24% |
| 35 | 12 | 420° | 0.34% |

As mentioned above, both the PET film 12 and the polypropylene film 14 are bi-axially oriented. The properties of bi-axially oriented films are different between the machine direction and the transverse direction of the film. In practice, it has been found that, when laminated together as shown in FIG. 1, the axis about which curl occurs varies according to the method of manufacture of the film 14.

Oriented polypropylene films may be manufactured by the blown film method or the stenter process. In the blown film process, the polymer is forced through an extrusion head which forms it into a tube which is inflated between the extrusion head and a pair of nip rollers. The bubble stretches the film in the transverse direction while the nip rollers stretch the bubble in the machine direction by drawing the film at a rate faster than the rate of discharge from the extrusion head.

In the stenter process, the polymer is extruded through a flat die as a sheet. The sheet passes through rollers running at different speeds which stretch the film in the machine direction, while orientation in the transverse direction is achieved by a stenter in which the film is gripped at its edges and stretched.

Figure 4A:
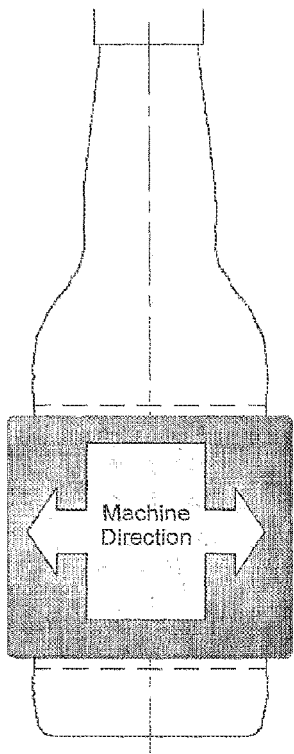
FIGS. 4a, 4b and 4c show the application of a label to a bottle.
Figure 4B:
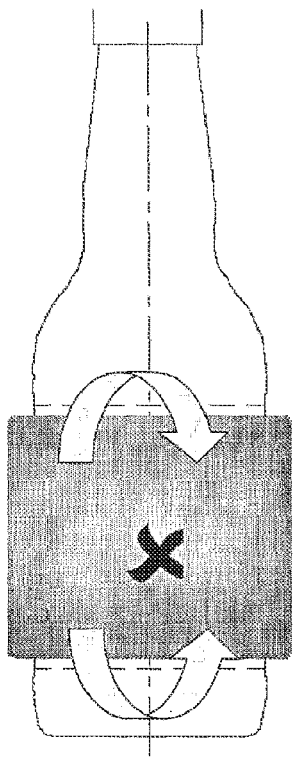
Figure 4C:
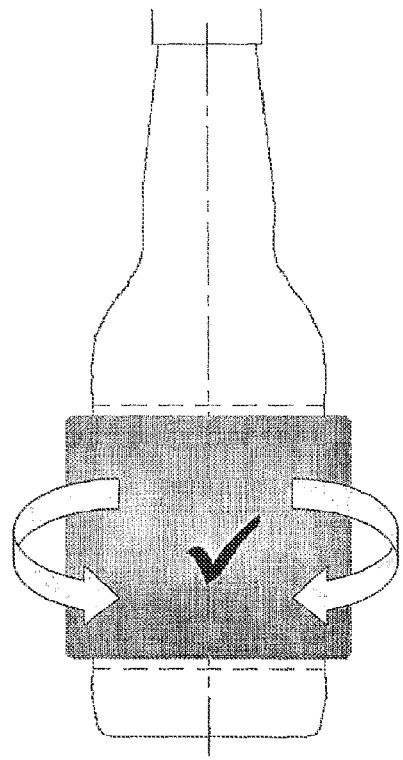

It has been found that, unless special measures are taken, oriented polypropylene films manufactured by the blown film method tend to curl in the transverse direction, i.e. the curl occurs about an axis which extends parallel to the machine direction of the film so that the label tends to curl into a cylinder which extends in the machine direction. Normal practice is for reel-fed labels to be applied to bottles with the machine direction of the label extending around the bottle, as shown in FIG. 4a. This is because the web runs parallel to the travel direction of the bottles as the labels are applied. However, if a label with this property is applied to a cylindrical article such as a bottle, it will then be curved around the bottle so that the machine direction of the film is curved. This is represented in FIG. 4b. The resulting curved label will thus resist any tendency to curl about an axis parallel to the plane in which lies the curved machine direction of the film. In other words, the label will resist curling away from the bottle at its top and bottom edges, and it is possible that this resistance will overcome any tendency to curl in response to the differential expansion of the layers of the label. Consequently, it is desirable for the label to have a tendency to curl about an axis perpendicular to the machine direction, so that the label will curl away from the cylindrical article about an axis which is parallel to the longitudinal axis of the article, as shown in FIG. 4c.

By adopting special measures, for example by selecting appropriate grades of oriented polypropylene films (for example those known to be suitable for use in the manufacture of labels), and by using the stenter process, it has been found possible to produce labels which tend to curl about an axis parallel to the transverse direction. Such labels will therefore tend to curl away from the bottle or other curved container by lifting away from the bottle at its lateral edges.

The invention claimed is:

1. A label which is removable from an article when heated, the label comprising:
   a polymeric film backing layer comprising a laminate of a polypropylene film material and another film material having different linear coefficients of thermal expansion; and
   an adhesive layer disposed adjacent the polypropylene film for bonding the label to the article,
   wherein the backing layer expands when subjected to heat and a linear coefficient of thermal expansion of the film material nearer to the adhesive layer is not less than double the linear coefficient of thermal expansion of the film material further from the adhesive layer so that the label tends to curl into a curved configuration with the adhesive layer on the outside of the curve.

2. A label as claimed in claim 1, in which the polypropylene film has a modulus of elasticity in the machine direction which is not less than 2000 N/mm2 and not more than 2500 N/mm2.

3. A label as claimed in claim 1, in which the modulus of elasticity of the polypropylene film in the transverse direction is not less than 3000 N/mm2 and not more than 4000 N/mm2.

4. A label as claimed in claim 1, in which one of the film materials is a polyester.

5. A label as claimed in claim 1, in which the film materials are of different thickness from each other.

6. A label as claimed in claim 5, in which one of the films has a thickness which is 20% to 75% of the thickness of the other film.

7. A label as claimed in claim 5, in which the thicker layer has a thickness not less than 25 μm and not more than 50 μm.

8. A label as claimed in claim 7, in which one of the film materials is a polypropylene and one of the film materials is a polyester, and in which the polypropylene film has a thickness not less than 40 μm and not more than 60 μm and the polyester film has a thickness not less than 20 μm and not more than 30 μm.

9. A label as claimed in claim 8, in which the polypropylene film has a thickness of 50 μm and the polyester film has a thickness of 23 μm.

10. A label as claimed in claim 1, in which at least one of the films comprises an oriented polymer.

11. A label as claimed in claim 10, in which both films comprises a bi-axially oriented polymer.

12. A label as claimed in claim 1, which, when unsupported, curls to assume an arc extending around 360° at a temperature below 80° C.

13. An article carrying a label in accordance with claim 1.

14. An article as claimed in claim 13 which is a bottle.

* * * * *